(12) United States Patent
Jin et al.

(10) Patent No.: US 8,219,518 B2
(45) Date of Patent: Jul. 10, 2012

(54) METHOD AND APPARATUS FOR MODELLING DATA EXCHANGE IN A DATA FLOW OF AN EXTRACT, TRANSFORM, AND LOAD (ETL) PROCESS

(75) Inventors: Qi Jin, San Jose, CA (US); Hui Liao, Santa Clara, CA (US); Sriram Srinivasan, Sunnyvale, CA (US); Lin Xu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1334 days.

(21) Appl. No.: 11/621,521

(22) Filed: Jan. 9, 2007

(65) Prior Publication Data

US 2008/0168082 A1    Jul. 10, 2008

(51) Int. Cl.
*G06F 7/00* (2006.01)
(52) U.S. Cl. ........................ 707/602; 707/798
(58) Field of Classification Search .................. 707/602, 707/798
See application file for complete search history.

(56) References Cited

U.S. PATENT DOCUMENTS

| | | | |
|---|---|---|---|
| 4,813,013 A | 3/1989 | Dunn | |
| 4,901,221 A | 2/1990 | Kodosky et al. | |
| 5,379,423 A | 1/1995 | Mutoh et al. | |
| 5,497,500 A | 3/1996 | Rogers et al. | |
| 5,577,253 A | 11/1996 | Blickstein | |
| 5,729,746 A | 3/1998 | Leonard | |
| 5,850,548 A | 12/1998 | Williams | |
| 5,857,180 A | 1/1999 | Hallmark et al. | |
| 5,920,721 A | 7/1999 | Hunter et al. | |
| 5,966,532 A | 10/1999 | McDonald et al. | |
| 6,014,670 A | 1/2000 | Zamanian et al. | |
| 6,044,217 A | 3/2000 | Brealey et al. | |
| 6,098,153 A | 8/2000 | Fuld et al. | |
| 6,202,043 B1 | 3/2001 | Devoino et al. | |
| 6,208,345 B1 | 3/2001 | Sheard et al. | |
| 6,208,990 B1 | 3/2001 | Suresh et al. | |
| 6,243,710 B1 | 6/2001 | DeMichiel et al. | |
| 6,282,699 B1 | 8/2001 | Zhang et al. | |
| 6,434,739 B1 | 8/2002 | Branson et al. | |
| 6,449,619 B1 | 9/2002 | Colliat et al. | |

(Continued)

OTHER PUBLICATIONS

Alkis Simitsis. "Mapping Conceptual to Logical Models for ETL Processes." ACM, 2005, pp. 67-77.*

(Continued)

*Primary Examiner* — Shahid Alam
*Assistant Examiner* — Alexandria Bromell
(74) *Attorney, Agent, or Firm* — Patterson & Sheridan, LLP

(57) ABSTRACT

Methods, systems, and computer program products for generating code from a data flow associated with an extract, transform, and load (ETL) process. In one implementation, the method includes identifying a data exchange requirement between a first operator and a second operator in the data flow. The first operator is a graphical object that represents a first data transformation step in the data flow and is associated with a first type of runtime engine, and the second operator is a graphical object that represents a second data transformation step in the date flow and is associated with a second type of runtime engine. The method further includes generating code to manage data staging between the first operator and the second operator in the data flow. The code exchanges data from a format associated with the first type of runtime engine to a format associated with the second type of runtime engine.

20 Claims, 7 Drawing Sheets

U.S. PATENT DOCUMENTS

| | | | |
|---|---|---|---|
| 6,480,842 B1* | 11/2002 | Agassi et al. | |
| 6,604,110 B1* | 8/2003 | Savage et al. | 707/602 |
| 6,738,964 B1 | 5/2004 | Zink et al. | |
| 6,772,409 B1* | 8/2004 | Chawla et al. | 717/106 |
| 6,795,790 B1 | 9/2004 | Lang et al. | |
| 6,807,651 B2 | 10/2004 | Saluja et al. | |
| 6,839,724 B2* | 1/2005 | Manchanda et al. | 707/625 |
| 6,850,925 B2 | 2/2005 | Chaudhuri et al. | |
| 6,968,326 B2 | 11/2005 | Johnson et al. | |
| 6,968,335 B2* | 11/2005 | Bayliss et al. | 707/705 |
| 6,978,270 B1* | 12/2005 | Carty et al. | 707/705 |
| 7,003,560 B1 | 2/2006 | Mullen et al. | |
| 7,031,987 B2* | 4/2006 | Mukkamalla et al. | 707/705 |
| 7,035,786 B1 | 4/2006 | Abu El Ata et al. | |
| 7,076,765 B1 | 7/2006 | Omori | |
| 7,103,590 B1* | 9/2006 | Murthy et al. | 707/705 |
| 7,191,183 B1* | 3/2007 | Goldstein | 707/602 |
| 7,209,925 B2* | 4/2007 | Srinivasan et al. | 707/602 |
| 7,340,718 B2 | 3/2008 | Szladovics et al. | |
| 7,343,585 B1 | 3/2008 | Lau et al. | |
| 7,499,917 B2 | 3/2009 | Purcell et al. | |
| 7,689,576 B2 | 3/2010 | Rao et al. | |
| 7,689,582 B2 | 3/2010 | Behnen et al. | |
| 7,739,267 B2 | 6/2010 | Jin et al. | |
| 7,747,563 B2* | 6/2010 | Gehring | 707/602 |
| 2002/0046301 A1* | 4/2002 | Shannon et al. | 709/328 |
| 2002/0078262 A1 | 6/2002 | Harrison et al. | |
| 2002/0116376 A1 | 8/2002 | Iwata et al. | |
| 2002/0170035 A1 | 11/2002 | Casati et al. | |
| 2002/0198872 A1 | 12/2002 | MacNicol et al. | |
| 2003/0033437 A1 | 2/2003 | Fischer et al. | |
| 2003/0037322 A1 | 2/2003 | Kodesky et al. | |
| 2003/0051226 A1 | 3/2003 | Zimmer et al. | |
| 2003/0101098 A1 | 5/2003 | Schaarschmidt | |
| 2003/0110470 A1 | 6/2003 | Hanson et al. | |
| 2003/0149556 A1 | 8/2003 | Riess | |
| 2003/0154274 A1 | 8/2003 | Nakamura | |
| 2003/0172059 A1 | 9/2003 | Andrei | |
| 2003/0182651 A1 | 9/2003 | Secrist et al. | |
| 2003/0229639 A1 | 12/2003 | Carlson et al. | |
| 2003/0233374 A1 | 12/2003 | Spinola et al. | |
| 2003/0236788 A1 | 12/2003 | Kanellos et al. | |
| 2004/0054684 A1 | 3/2004 | Geels | |
| 2004/0068479 A1* | 4/2004 | Wolfson et al. | 707/1 |
| 2004/0107414 A1 | 6/2004 | Bronicki et al. | |
| 2004/0220923 A1 | 11/2004 | Nica | |
| 2004/0254948 A1* | 12/2004 | Yao | 707/101 |
| 2005/0022157 A1 | 1/2005 | Brendle et al. | |
| 2005/0044527 A1 | 2/2005 | Recinto | |
| 2005/0055257 A1* | 3/2005 | Senturk et al. | 705/8 |
| 2005/0091664 A1 | 4/2005 | Cook et al. | |
| 2005/0091684 A1 | 4/2005 | Kawabata et al. | |
| 2005/0097103 A1* | 5/2005 | Zane et al. | 707/6 |
| 2005/0108209 A1 | 5/2005 | Beyer et al. | |
| 2005/0131881 A1 | 6/2005 | Ghosh et al. | |
| 2005/0137852 A1 | 6/2005 | Chari et al. | |
| 2005/0149914 A1 | 7/2005 | Krapf et al. | |
| 2005/0174986 A1 | 8/2005 | Emond et al. | |
| 2005/0174988 A1 | 8/2005 | Bieber et al. | |
| 2005/0188353 A1 | 8/2005 | Hasson et al. | |
| 2005/0216497 A1 | 9/2005 | Kruse et al. | |
| 2005/0227216 A1 | 10/2005 | Gupta | |
| 2005/0234969 A1 | 10/2005 | Mamou et al. | |
| 2005/0240354 A1* | 10/2005 | Mamou et al. | 702/19 |
| 2005/0240652 A1 | 10/2005 | Crick | |
| 2005/0243604 A1* | 11/2005 | Harken et al. | 365/185.22 |
| 2005/0256892 A1* | 11/2005 | Harken | 707/101 |
| 2005/0283473 A1 | 12/2005 | Rousso et al. | |
| 2006/0004863 A1 | 1/2006 | Chan et al. | |
| 2006/0015380 A1 | 1/2006 | Flinn et al. | |
| 2006/0036522 A1 | 2/2006 | Perham | |
| 2006/0047709 A1 | 3/2006 | Belin et al. | |
| 2006/0074621 A1 | 4/2006 | Rachman | |
| 2006/0074730 A1 | 4/2006 | Shukla et al. | |
| 2006/0101011 A1 | 5/2006 | Lindsay et al. | |
| 2006/0112109 A1* | 5/2006 | Chowdhary et al. | 707/100 |
| 2006/0167865 A1 | 7/2006 | Andrei | |
| 2006/0174225 A1 | 8/2006 | Bennett et al. | |
| 2006/0206869 A1 | 9/2006 | Lewis et al. | |
| 2006/0212475 A1* | 9/2006 | Cheng | 707/104.1 |
| 2006/0218123 A1 | 9/2006 | Chowdhuri et al. | |
| 2006/0228654 A1 | 10/2006 | Sanjar et al. | |
| 2007/0061305 A1* | 3/2007 | Azizi | 707/3 |
| 2007/0078812 A1 | 4/2007 | Waingold et al. | |
| 2007/0157191 A1 | 7/2007 | Seeger et al. | |
| 2007/0169040 A1 | 7/2007 | Chen | |
| 2007/0203893 A1* | 8/2007 | Krinsky et al. | 707/3 |
| 2007/0214111 A1 | 9/2007 | Jin et al. | |
| 2007/0214171 A1* | 9/2007 | Behnen et al. | 707/102 |
| 2007/0214176 A1 | 9/2007 | Roa et al. | |
| 2007/0244876 A1 | 10/2007 | Jin et al. | |
| 2008/0092112 A1 | 4/2008 | Jin et al. | |
| 2008/0147703 A1 | 6/2008 | Behnen et al. | |
| 2008/0147707 A1 | 6/2008 | Jin et al. | |

OTHER PUBLICATIONS

Alkis Simitisis, Mapping Conceptual to Logical Models for ETL Processes, ACM, 2005.*

Arusinski et al., "A Software Port from a Standalone Communications Management Unit to an Integrated Platform", 2002, IEEE, pp. 1-9.

Carreira et al., "Execution of Data Mappers", IQIS, 2004, pp. 2-9, 2004 ACM 1-58113-902-0/04/0006, Paris, France.

Carreira et al., "Data Mapper: An Operator for Expressing One-to Many Data Transformations", Data Warehousing and Knowledge Discovery, Tjoa et al, editors, 7th International Conference DaWaK 2005 Copenhagen, Denmark, Aug. 22-26, 2005, pp. 136-145.

Ferguson et al., "Platform Independent Translations for a Compilable Ada Abstract Syntax", Feb. 1993 ACM 0-89791-621-2/93/0009-0312 1.50, pp. 312-322.

Friedrich, II, Meta-Data Version and Configuration Management in Multi-Vendor Environments, SIGMOD, Jun. 14-16, 2005, 6 pgs., Baltimore, MD.

Gurd et al., "The Manchester Prototype Dataflow Computer", Communications of the ACM, Jan. 1985, pp. 34-52, vol. 28, No. 1.

Hernandez et al., "Clio: A schema mapping tool for information integration", IEEE Computer Society, 2005.

Haas et al., "Clio Grows Up: From Research Prototype to Industrial Tool", SIGMOD, Jun. 14-16, 2005, 6 pgs., Baltimore, MD.

Jardim-Gonçalves et al., "Integration and adoptability of APs: the role of ISO TC184/SC4 standards", International Journal of Computer Applications in Technology, 2003, pp. 105-116, vol. 18, Nos. 1-4.

Poess et al., "TPC-DS, Taking Decision Support Benchmarking to the Next Level", ACM SIGMOD, Jun. 4-6, 2002, 6 pgs., Madison, WI.

Ramu, "Method for Initializing a Plateform and Code Independent Library", IBM Technical Disclosure Bulletin, Sep. 1994, pp. 637-638, vol. 37, No. 9.

Rafaieh et al., "Query-based data warehousing tool", DOLAP, Nov. 8, 2002, 8 pgs., McLean, VA.

Simitsis, "Mapping Conceptual to Logical Models for ETL Processes", ACM Digital Library, 2005, pp. 67-76.

Stewart et al., "Dynamic Applications from the Ground Up", Haskell '05, Sep. 30, 2005, Tallinn, Estonia, ACM, pp. 27-38.

Vassiliadis et al., "A generic and customizable framework for the design of ETL scenarios", Information Systems, Databases: Creation, Management and Utilization, 2005, pp. 492-525, vol. 30, No. 7.

Werner et al., "Just-in-sequence material supply—a simulation based solution in electronics", Robotics and Computer-Integrated Manufacturing, 2003, pp. 107-111, vol. 19, Nos. 1-2.

Yu, "Transform Merging of ETL Data Flow Plan", IKE '03 International Conference, 2003, pp. 193-198.

Zhao et al., "Automated Glue/Wrapper Code Generation in Integration of Distributed and Heterogeneous Software Components", Proceedings of the 8th IEEE International Enterprise Distributed Object Computing Conf. (EDOC 2004), 2004, IEEE, pp. 1-11.

U.S. Appl. No. 09/707,504, filed Nov. 7, 2000, Banavar, et al.

Tjoa, et al. (Eds.), "Data Warehousing and Knowledge Discovery," Proceedings of 7th International Conference, DaWaK 2005, Copenhagen, Denmark, Aug. 22-26, 2005, Springer 2005.

Konstantinides, et al., "The Khoros Software Development Environment for Image and Signal Processing," May 1994, IEEE, vol. 3, pp. 243-252.

Office Action for U.S. Appl. No. 11/372,540 dated Mar. 30, 2011.

Notice of Allowance for U.S. Appl. No. 11/548,659 dated May 13, 2011.

Final Office Action for U.S. Appl. No. 11/610,480 dated Apr. 13, 2011.

U.S. Patent Application entitled "Method and Apparatus for Adapting Application Front-Ends to Execute on Heterogeneous Device Platforms", filed Nov. 7, 2000.

Office Action history of U.S. Appl. No. 11/372,540, dates ranging from Mar. 11, 2009 to Sep. 19, 2011.

Office Action history of U.S. Appl. No. 11/548,632, dates ranging from May 11, 2010 to Jul. 11, 2011.

Office Action history of U.S. Appl. No. 11/373,084, dates ranging from Feb. 20, 2009 to Feb. 3, 2010.

Ives, Zachary G., An Adaptive Query Execution System for Data Integration, Proceedings of the 1999 ACM SIGMOD international conference on Management of data, Jun. 1999, vol. 28, Issue 2, ACM, New York, New York, United States.

Office Action history of U.S. Appl. No. 11/373,685, dates ranging from Jan. 10, 2008 to Nov. 16, 2009.

Office Action history of U.S. Appl. No. 11/372,516, dates ranging from Apr. 6, 2006 to Nov. 17, 2009.

Office Action history of U.S. Appl. No. 11/548,659, dates ranging from Nov. 10, 2010 to Sep. 14, 201t.

Office Action history of U.S. Appl. No. 11/610,480, dates ranging from Sep. 10, 2010 to Aug. 31, 2011.

* cited by examiner

METHOD AND APPARATUS FOR MODELLING DATA EXCHANGE IN A DATA FLOW OF AN EXTRACT, TRANSFORM, AND LOAD (ETL) PROCESS

CROSS-REFERENCE TO RELATED APPLICATIONS

This application is related to U.S. Patent Application entitled "System and Method for Generating Code for an Integrated Data System," Ser. No. 11/372,540, filed on Mar. 10, 2006, U.S. Patent Application entitled "Data Flow System and Method for Heterogeneous Data Integration Environments," Ser. No. 11/373,685, filed on Mar. 10, 2006, U.S. Patent Application entitled "Dilation of Sub-Flow Operators in a Data Flow," Ser. No. 11/372,516, filed on Mar. 10, 2006, U.S. Patent Application entitled "Classification and Sequencing of Mixed Data Flows," Ser. No. 11/373,084, filed on Mar. 10, 2006, U.S. Patent Application entitled "Method and Apparatus for Managing Application Parameters," Ser. No. 11/548,632, filed on Oct. 11, 2006, U.S. Patent Application entitled "Method and Apparatus for Generating Code for an Extract, Transform, and Load (ETL) Data Flow," Ser. No. 11/548,659, filed on Oct. 11, 2006, and U.S. Patent Application entitled "Method and Apparatus for Using Set Based Structured Query Language (SQL) to Implement Extract, Transform, and Load (ETL) Splitter Operation," Ser. No. 11/610,480, filed on Dec. 13, 2006 the disclosures of which are incorporated by reference herein.

FIELD OF THE INVENTION

The present invention relates generally to data processing, and more particularly to modeling data exchange in a data flow associated with an extract, transform, and load (ETL) process.

BACKGROUND OF THE INVENTION

Extract, transform, and load (ETL) is a process in data warehousing that involves extracting data from outside sources, transforming the data in accordance with particular business needs, and loading the data into a data warehouse. An ETL process typically begins with a user defining a data flow that defines data transformation activities that extract data from, e.g., flat files or relational tables, transform the data, and load the data into a data warehouse, data mart, or staging table. A data flow, therefore, typically includes a sequence of operations modeled as data flowing from various types of sources, through various transformations, and finally ending in one or more targets, as described in U.S. patent application entitled "Classification and Sequencing of Mixed Data Flows" incorporated by reference above. In the course of execution of a data flow, data sometimes needs to be exchanged or staged at intermediate points within the data flow. The staging of data typically includes saving the data temporarily either in a structured physical storage medium (such as in a simple file) or in database temporary tables or persistent tables. In some cases, it may be optimal to save rows of data in the processing program's memory itself, especially when large and fast caches are present in the system (such "staging" is often referred to as "caching").

ETL vendors conventionally support data exchange and staging internally inside of an ETL engine in a proprietary fashion, especially if the ETL engine is running outside of a relational database. For example, the DataStage ETL engine permits users to build "stages" of operations—i.e., discrete steps in the transformation sequence—and physically move rows between different stage components in memory. (Note: The term "stage" as used in the context of the DataStage engine—does not refer to the concept of saving rows to a physical media, but rather to unique operational steps). This method, typically allows for some types of performance optimizations; however, the rows of data being moved between the different stages are usually in an internal format (stored in internal memory formats in buffer pools) and the only way a user can view the rows of data is to explicitly define a File Target (or a Table Target) in the data flow and force the rows of data to be saved into a file (or a table)—i.e., only the target of such a data flow can physically export the rows into a user recognizable format.

Accordingly, a common problem of conventional data exchange and staging techniques is that users are not able to specify staging points explicitly and directly in the middle of a data flow, but only as the end of a transformation sequence using target operators. Target operators typically do not serve as an exchange operator—since target operators are destinations. For example, if a user needs to extract rows from a SQL (structured query language) table and pass the rows as input to another type of system which requires a file as input, then the user would have to represent such a process with a first job—as a Table Source operation followed by a File Target or Export operation having a specific file name. The user would then have to schedule a second (separate) job to invoke an operation that uses the file as input.

BRIEF SUMMARY OF THE INVENTION

In general, this specification describes methods, systems, and computer program products for generating code from a data flow associated with an extract, transform, and load (ETL) process. In one implementation, the method includes identifying a data exchange requirement between a first operator and a second operator in the data flow. The first operator is a graphical object that represents a first data transformation step in the data flow and is associated with a first type of runtime engine, and the second operator is a graphical object that represents a second data transformation step in the data flow and is associated with a second type of runtime engine. The method further includes generating code to manage data staging between the first operator and the second operator in the data flow associated with the ETL process. The code exchanges data from a format associated with the first type of runtime engine to a format associated with the second type of runtime engine.

Particular implementations can include one or more of the following advantages. In one aspect, a data station operator is provided that can be inserted into a data flow of an ETL process, in which the data station operator represents a staging point in a data flow. The staging is done to store intermediate processed data for the purpose of tracking, debugging, ease of data recovery, and optimization purposes. In one implementation, the data station operator also permits data exchange between two linked operators that are incompatible in a same single job. Relative to conventional techniques that requires two separate jobs to perform a data exchange between two operators that are incompatible, it is more optimal to use one single job that encompasses both systems, especially if the job is run in parallel and in batches—e.g., if upstream producers and downstream consumers work in sync in a parallel and batch driven mode, the end performance is better.

The details of one or more implementations are set forth in the accompanying drawings and the description below. Other features and advantages will be apparent from the description and drawings, and from the claims.

BRIEF DESCRIPTION OF THE DRAWINGS

FIG. 5 illustrates an example logical operator graph mapped to a query graph model (QGM) in accordance with one implementation of the invention.

FIG. 6 illustrates an example logical operator graph including operators associated with two different types of runtime engines in accordance with one implementation of the invention.

Like reference symbols in the various drawings indicate like elements.

DETAILED DESCRIPTION OF THE INVENTION

The present invention relates generally to data processing, and more particularly to modeling data-exchange in a data flow associated with an extract, transform, and load (ETL) process. The following description is presented to enable one of ordinary skill in the art to make and use the invention and is provided in the context of a patent application and its requirements. The present invention is not intended to be limited to the implementations shown but is to be accorded the widest scope consistent with the principles and features described herein.

Figure 1:
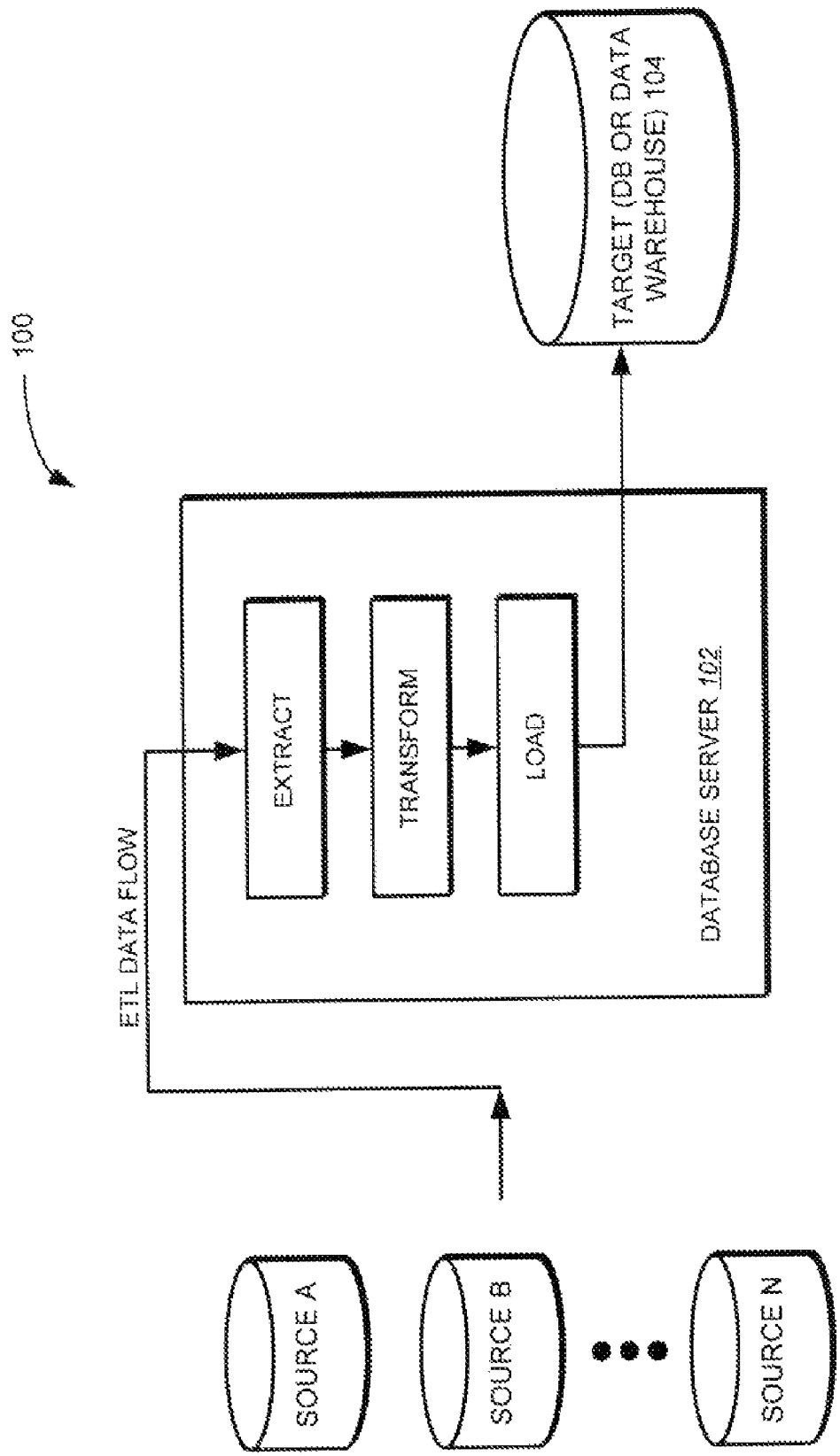
FIG. 1 illustrates an extract, transform, and load (ETL) system in accordance with one implementation of the invention.

FIG. 1 illustrates an extract, transform, and load (ETL) system 100 according to one implementation. The ETL system 100 includes a database server 102 that acts as an ETL engine to integrate data (e.g., from data sources A, B, . . . N) through an extract phase, a transform phase, and a load phase. The extract phase includes extracting data from source systems (e.g., from data sources A, B, . . . N). Most data warehousing projects consolidate data from different source systems. Each separate source system may also use a different data organization/format. Common data source formats include, for example, relational databases and flat tiles, and include non-relational database structures such as IMS. The extract phase includes converting the data into a format for transformation processing. The transform phase applies a series of rules or functions to the extracted data to derive the data to be loaded. The load phase loads the data into a data warehouse (e.g., data warehouse 104). Data integration typically begins with a user describing a data flow of an ETL process using a UI (user interface) tool. A data flow represents a logical transformation and flow of data. A code generation system generates code from the data flow, which generated code is then sent to the database server 102 for execution.

Figure 2:
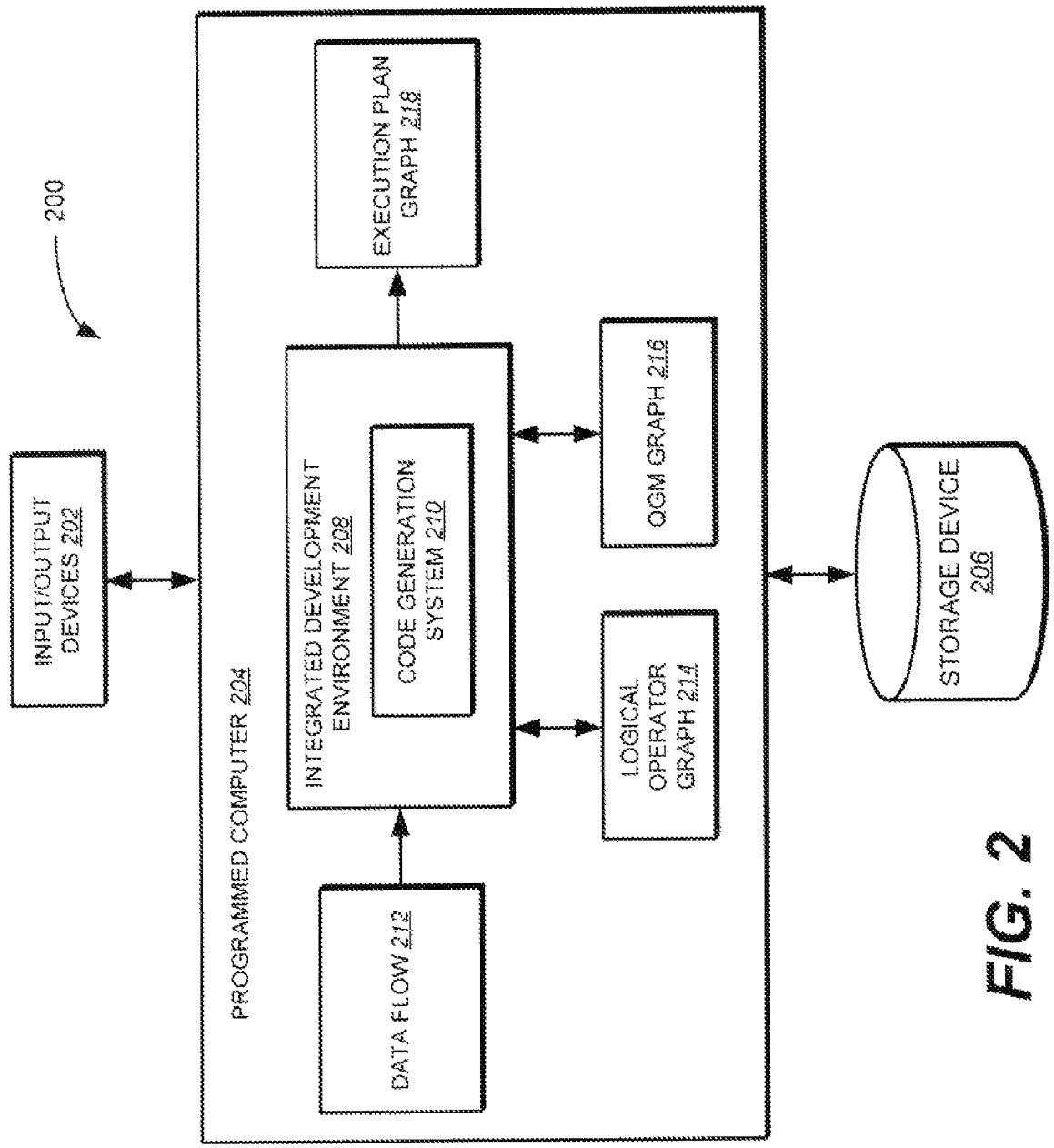
FIG. 2 is a block diagram of a data processing system including a code generation system in accordance with one implementation of the invention.

FIG. 2 illustrates a data processing system 200 in accordance with one implementation of the invention. The data processing system 200 can comprise the IBM DB2 Data Warehouse Edition (DWE) product available from International Business Machines Corporation of Armonk, N.Y. Data processing system 200 includes input and output devices 202, a programmed computer 204, and a storage device 206. Input and output devices 202 can include devices such as a printer, a keyboard, a mouse, a digitizing pen, a display, a printer, and the like. Programmed computer 204 can be any type of computer system, including for example, a workstation, a desktop computer, a laptop computer, a personal digital assistant (PDA), a cell phone, a network, and so on.

Running on the programmed computer 204 is an integrated development environment 208. The integrated development environment 208 is a software component that assists users (e.g., computer programmers) in developing, creating, editing, and managing code for target platforms.

In one implementation, the integrated development environment 208 includes code generation system 210 that (in one implementation) is operable to generate code to manage data exchange and data staging within a sequence of operations defined in a data flow of an ETL process, as discussed in greater detail below. In one implementation, the code generator 210 generates code using techniques as described in U.S. Patent Application entitled "Classification and Sequencing of Mixed Data Flows," Ser. No. 11/372,540, filed on Mar. 10, 2006 (the '540 application), which is incorporated by reference above.

In operation, a data flow 212 (e.g., an ETL data flow) is received by the code generation system 210, and the data flow 212 is converted by the code generation system into a logical operator graph (LOG) 214. The logical operator graph 214 is a normalized, minimalist representation of the data flow 212 that includes logical abstract collection of operators (including, e.g., one or more of a splitter operator, join operator, filter operator, table extract operator, bulk load operator, aggregate operator, and so on). In some implementations, all of the contents of the data flow 212 may be used "as-is" by the code generation system 210 and, therefore, the logical operator graph 214 will be the same as the data flow 212. The code generation system 210 converts the logical operator graph 214 into a query graph model (QGM graph) 216. The QGM graph 216 is an internal data model used by the code generation system 210 for analysis and optimization processes, such as chunking (in which a subset of a data flow is broken into several pieces to improve performance) and execution parallelism (in which disparate sets of operations within a data flow are grouped and executed in parallel to yield better performance). After analysis, the QGM 216 is converted into an extended plan graph 218. The extended plan graph 218 represents code generated by the code generation system 210 and is sent to a runtime engine (e.g., an ETL engine) for execution.

Figure 3:
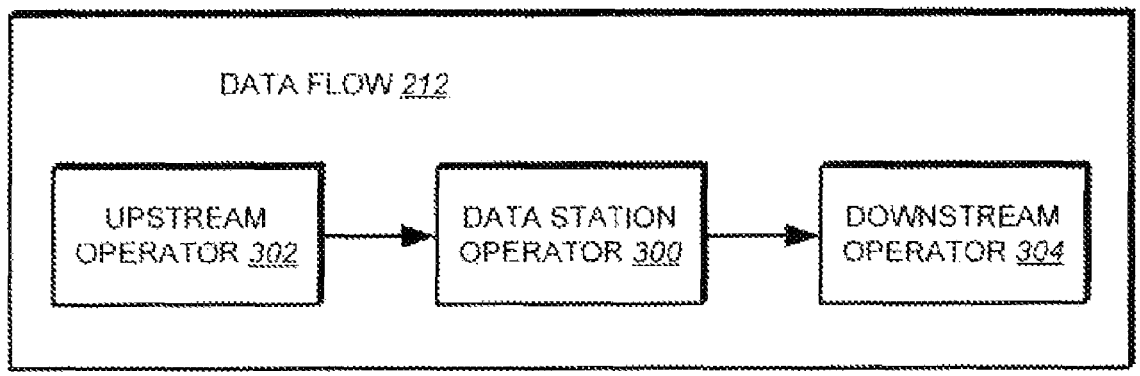
FIG. 3 is a block diagram of a data flow in accordance with one implementation of the invention.

In one implementation, the integrated development environment 208 includes a data flow graphical editor (not shown) that enables users to build data flows (e.g., data flow 212). In one implementation, the data flow graphical editor provides a new operator—i.e., a data station operator—that a user can directly drag and drop into a data flow to link a preceding ("upstream") operator and one or more subsequent ("downstream") operators, which data station operator specifies a data staging point in the data flow. In general, operators are represented in a data flow as graphical objects. In one implementation, the data station operator can be used as a link between a first operator (or operation) associated with first runtime engine (e.g., a relational database management system) and a second operator associated with a second runtime engine (e.g., a DataStage ETL engine). FIG. 3 illustrates the data flow 212 including a data station operator 300 linking an upstream operator 302 to a downstream operator 304. In one implementation, staging refers to writing data to a disk, and permits a user to store intermediate data at various points of a data flow in a relational table, flat file or a view. A staging point indicates a location on the data flow where the data is staged. In one implementation, a staging point occurs on an operator's output port.

In one implementation, the code generation system 210 is operable to automatically place individual data station operators (into a sequence of operations defined by a data flow) whenever a data exchange requirement is identified during the code generation process. In one implementation, the identification and insertion of the data exchange/staging points are seamless to the end user. Accordingly, in such an implementation, the code generation system 210 is operable to automatically generate code that manages data staging and data exchange on an ETL system that is capable of integrating various data processing runtime engines. For example, if a particular runtime engine can work with flat files as well as database tables, depending on certain optimization considerations, there may not be an exchange necessary, or if flat files are determined to be processed faster, then a file staging from an upstream operation (e.g., associated with a relational database engine) may be decided by the code generation system 210 to be more appropriate—or a decision could be made based on current system loads. A dynamic decision (based on various cost-benefit analyses) on whether a data station operator is required, may be best decided by the code generation system 210. In such cases, any suitable cost-benefit criteria can be implemented. In some cases, however, (expert) users or database administrators may have better knowledge than the code generation system 210 because of an understanding of expected data and expected system stress, e.g., when data is range partitioned and the administrator would be aware of which particular database partition nodes would be stressed. In such cases, it may be more appropriate for a user to explicitly override any staging options automatically selected by the code generation system 210 (or for a user to explicitly define a different staging format when the code generation system 210 does not add one by default).

Accordingly, unlike a conventional system in which a user must represent data staging using two or more jobs in order to exchange data from one runtime format (e.g., database table) to another runtime format (e.g., a flat file) in a data flow, the data processing system 200 permits a user to exchange data from one system-format to another in the same single job through the data station operator. Users can, therefore, use such data stations to explicitly identify points of staging or exchange interest, e.g., for diagnostics, for performance improvements, or for overriding any default choices made by the code generation system 210.

Figure 4:
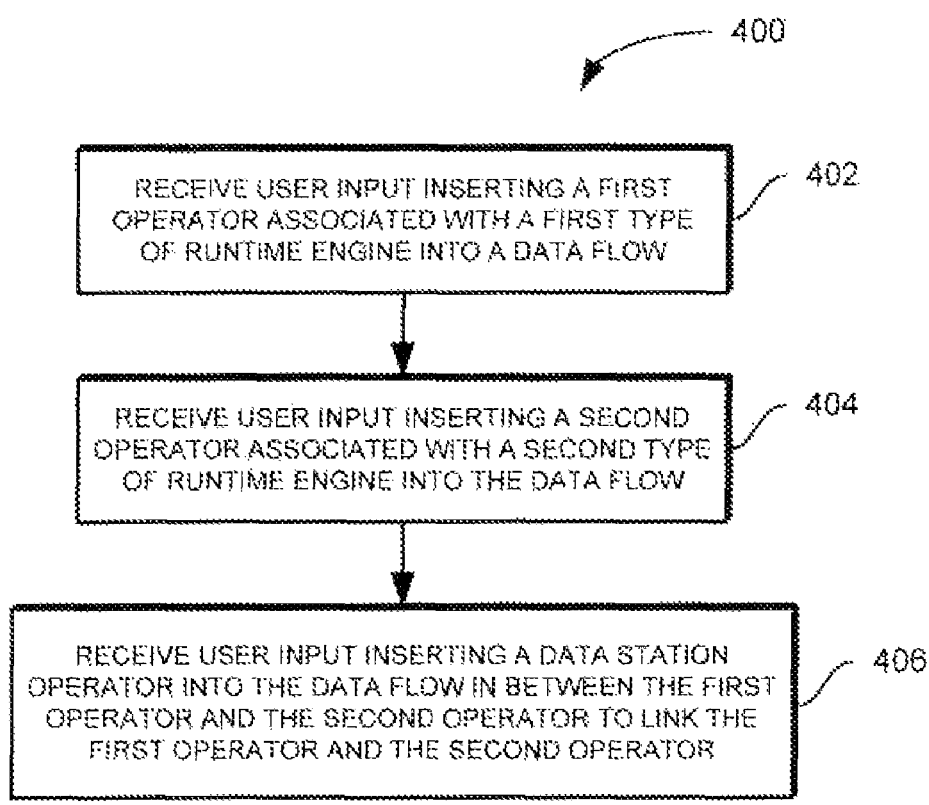
FIG. 4 is a flow diagram of a method for inserting a data station operator into a data flow in accordance with one implementation of the invention.

FIG. 4 is a flow diagram illustrating a computer-implemented method 400 for inserting a data station operator into a data flow (e.g., data flow 212) in accordance with one implementation of the invention. The method 400 begins with a data processing system (e.g., data processing system 200) receiving user input inserting a first operator (or operation) associated with a first type of runtime engine into a data flow (e.g., a data flow 212) (step 402). There are various types of runtime engines that may be used to process ETL operations—e.g., a relational database engine or a DataStage ETL engine among others. In addition, there are many different types of operators representing corresponding ETL operations (such as structured query language operations and ETL DataStage operations) that can be inserted by a user into a data flow. Some operators associated with a relational database engine include, for example, a table extract operator, a join operator, a de-duplicate operator, a bulk load table operator, a file target operator, and so on. Some operators associated with a DataStage ETL engine include, for example, a file extract operator, a filter operator, and so on.

User input is received inserting a second operator associated with a second type of runtime engine into the data flow (step 404). In one example, the first operator can be associated with a relational database engine and the second operator can be associated with a DataStage ETL engine. The first operator and the second operator can be transform operators that represent data transformation steps in the data flow. User input is received inserting a data station operator (e.g., data station operator 300) into the data flow between the first operator and the second operator to link the first operator and the second operator (step 406). Thus, the data processing system permits the user to explicitly add a data staging operator into a data flow, in which the data staging operator exchanges data from a format associated with the first runtime engine into a format associated with the second runtime engine in a same single job.

Figure 5:
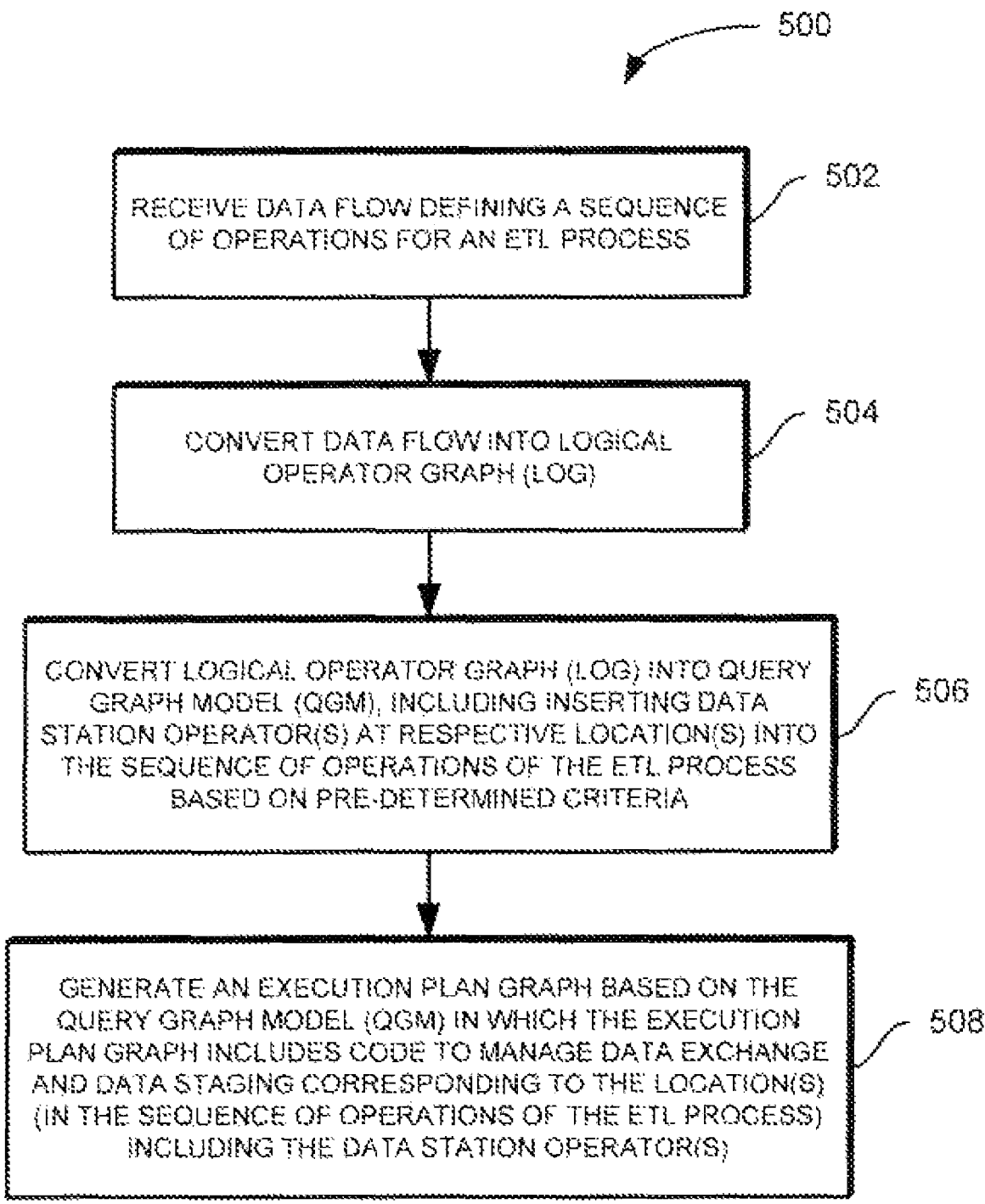
FIG. 5 is a flow diagram of method for processing a data flow in accordance with one implementation of the invention.

FIG. 5 illustrates 5 a method 500 for processing a data flow in accordance with one implementation of the invention. The method 500 begins with a code generation system (e.g., code generation system 210) receiving a data flow defining a sequence of operations for an ETL process (step 502). A data flow represents a logical transformation and flow of data, and is typically built based on user input. For example, versions of the IBM DB2 Data Warehouse Edition (DWE) product have a data flow graphical editor that enables users to build data flows. The data flow can include one or more data stations operators to link corresponding upstream operators and downstream operators within the data flow, as discussed above. The data flow is converted to a logical operator graph (LOG) (e.g., logical operator graph 214) by the code generation system (step 304). As discussed above, (in one implementation) the logical operator graph (LOG) is a minimalist representation of the data flow and includes an abstract collection of operators. The logical operator graph is converted (e.g., by code generation system 210) into a query graph model (QGM) (e.g., QGM graph 216) (step 306). As discussed above, the query graph model is an internal data structure used by the code generation system for analysis and optimization purposes. In one implementation, the code generation system automatically inserts one or more additional data station operators into the sequence of operations of the ETL process based on a cost-benefit analysis. In another implementation, the code generation system automatically inserts one or more data station operators into the sequence of operations of the ETL process based on pre-determined criteria.

Pre-determined criteria upon which the code generation system (or a user) may decide to insert a data station operator into a data flow include, for example, criteria associated with optimization, error recovery and restart, diagnostics and debugging, and cross-system data exchanges. With regard to optimization, intermediate (calculated) data may be staged to avoid having to perform the same calculation multiple times, especially in cases where the output of a single upstream operation is required by multiple downstream operations.

Even when there is only one downstream consumer of the output data of a given operation, it may be prudent to stage rows of the output data, especially to a physical storage, in order to either free up memory or avoid stressing an execution system (for example, to avoid running out of database log space). With respect to error recovery and restart, in complex systems, errors during the execution of data flows may occur either due to bad (dirty) data which may cause database inconsistencies, or fatal errors doe to software failures, power loss etc. In many eases, manual intervention is required to bring databases and other systems back to a consistent state. Thus in one implementation, the code generation system (or user) inserts data station operators at specific consistency check points in the data flow, so that staging can be performed on intermediate results in a physical media (for example, in database persistent tables or files). Accordingly, restarts (either manual or automatic) can be performed starting at these check points, thus, saving quite a bit of time.

In terms of diagnostics and debugging, staging may allow administrators to identify the core cause of problems, for example, an administrator can inspect staged rows to find bad data, which may even require the administrator to re-organize ETL processes to first clean such data. Users may also explicitly add data stations in a data flow to aid in debugging of the data flow, e.g., during development and testing cycles. An inspection of such staged rows will provide a validation of whether the corresponding upstream operations did indeed perform as expected. With regard to cross-system exchanges, a data processing system that is capable of integrating various data processing engines such as the one described in the '540 application, the data being processed in such a data processing system is a mix of various data types and formats that are specific to a given underlying (runtime) data processing engine. Some runtime processing systems may be equipped to process data inside database tables, others may only work with flat files, while others may perform better using Message Queues. In some scenarios, external systems in a different (remote) site may be required to complete part of an operation—e.g., a "Name Address Lookup" facility which may be provided by an online vendor for cleansing customer addresses. Such an external vendor may even require a SOAP-based web service means of data movement.

Figure 6:
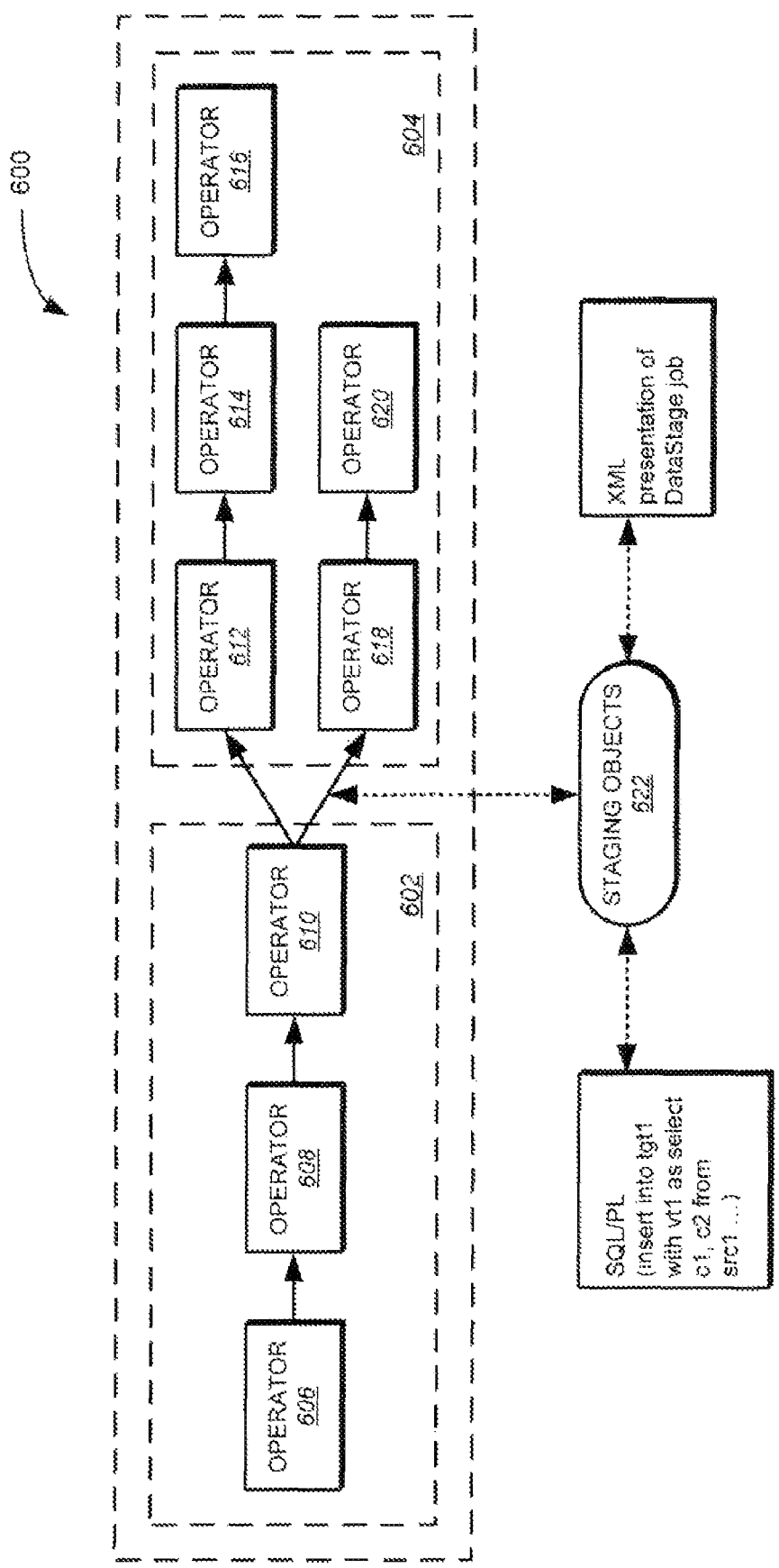
FIG. 6 illustrates an example data flow including operators associated with two different runtime engines in accordance with one implementation of the invention.

For example, FIG. 6 illustrates an example logical operator graph 600 including a first section 602 and a second section 604. The first section 602 includes operators 606-610 operable to process data having a format compatible with a first type of runtime engine (e.g., a relational database engine), and the second section 604 includes operators 612-620 that are operable to process data having a format compatible with a second type of runtime engine (e.g., a data stage ETL engine). For data that is produced by an operator in the first section 602 to be able to be consumed by an operator in the second section 604, staging objects 622 are generated by a code generation system to exchange data between the first section 602 and the second section 604 of the logical operator graph 600. The code generation system may convert the operators 606-610 into corresponding SQL/PL statements, and convert the operators 606-610 into an extensible mark-up language presentation.

Referring back to FIG. 5, an execution plan graph (e.g., execution plan graph 218) is generated (e.g., by code generation system 210) based on the query graph model (step 308). In one implementation, the execution plan graph includes code (e.g., for generating staging objects) to manage data exchange and data staging corresponding to locations in the sequence of operations of the ETL process in which the user or the code generation system have inserted a data station operator.

Provided below is further discussion regarding implementations of a data station operator and uses thereof.

Model of a Data Station Operator

In one implementation, a data station operator models a data exchange/staging object, and a code generator system generates code that supports staging and data exchange functionalities based on the data station operator. In one implementation, a data station operator is modeled using a data flow operator modeling framework as described in the '540 application. More generally, the concept of an operator is generic to many different ETL or transformation frameworks and, therefore, the concept of a data station operator can be extended for systems other many types of data processing systems. In one implementation, a data station operator has one input port, and one output port, and includes one or more of the following attributes as shown in Table 1 below.

TABLE 1

| Attribute | Definition |
| --- | --- |
| data station type | The type specifies the format of the staged data . . . e.g., temporary database table, permanent database table, database view, JDBC result set and flat file. |
| pass through flag | The pass though flag is a Boolean flag indicating if the associated data station operator can be ignored. This flag can be used to turn off a data station operator without a user having to physically remove the data station operator from a data flow. |
| name of staging object | The name corresponds to, e.g., a staging table name or staging file name. |
| data station lifetime | The lifetime permits a user to specify when a staging object should be cleaned and removed after a flow execution - i.e., removing a staging object at the end of an ETL flow execution, or keeping the staging object permanently. |
| performance hints | Performance hints include information such as DB partition information according to the source or target tables, index specification, whether to preserve incoming data orders etc. Allowing a user to specify performance hints gives the user flexibility to control data flow execution. |

Advantages of a Data Station Operator

Advantages of a data station operator include the following. With respect to performance, depending on the underlying runtime engine in which an ETL process is executed, staging intermediate data can yield better performance by controlling where and how data is flown through. For example, when the underlying ETL engine is a database server (e.g., DB2), the execution code of one data flow can be represented to one or several SQL statements. One single SQL statement can contain several levels of nested sub-queries to represent many transform operations. However, one single SQL statement could lead to runtime performance problems on certain DB servers. For example, two common problems could occur which are caused by one long SQL statement: 1) the log size that is required to run the SQL can be large if the number of nested queries reaches a certain level; 2) a single (nested) query is limited to DB vendor's query processing capability. In some cases, a single SQL statement will not work. In such case it is desirable to break the single SQL statement into smaller pieces for better performance.

With regard to data (format) exchange, when a data flow includes a mix of SQL operators and non-SQL operators, it is generally not possible to represent the data flow using one common language. Data flows through must be "staged" in order to transit from one type of operator to another. For example, consider a data flow that extracts data from a JDBC (Java Database Connectivity) source, goes through a couple of transformations, and then ends with the data being loaded into a target table. The code representing JDBC extraction is a java program, whereas the transformations and loads can be presented by SQL statements. In such cases, the output row sets from the JDBC extractor are staged into a DB2 table prior to sending the row sets to the following transform node.

A data station operator also permits tracing of data within a data flow. Providing a tracing functionality in a data flow permits users to monitor and track data flow runtime execution, and helps users diagnose problems when errors occur. Providing a data station operator permits a user to explicitly specify a staging point for an operator in a data flow at which a stage table/file will be created to capture all intermediate data that have been processed up to the staging point. Additional diagnostic information for the staging point can also be captured, such as number of rows processed, code being executed, temporary tables/files created, and so on. A data station operator also provides error recovery capability for a data flow. For example, when the execution of a data flow fails, the code generation system, or user, can select to begin a recovery process from a staged point where intermediate processed data is still valid. This permits for faster recovery from a failure relative to having to restart from the beginning of a data flow.

Pre-Determined Criteria for Inserting a Data Station Operator into a Data Flow

A data exchange/staging point identities a position where data exchange/staging is required in a data flow—e.g., either on a link or an output port. In one implementation, a staging point in a data flow is identified when one of the following conditions arises:

An explicit exchange/staging point specified by user. A staging point can be explicitly specified by the user using a data station operator. For example, a user can specify a staging point where the user wants to examine intermediate data sets processed during runtime, which helps for debugging and diagnosis purposes when error occurs. Optionally, the user can specify the data station repository type as well.

An implicit exchange/staging point identified by a code generation system. There are situations where implicit staging points are required. For example, in one implementation, staging points are required for an operator in a dataflow that requires chunking—e.g., a splitter operator requires chunking if there are multiple output streams going into different targets. Custom operator can also specify if input streams and/or output streams need to be chunked. In general, operators that typically require staging include splitter operators, operators that support the discarding of rows, and custom operators that require staging. Implicit staging point may also be required for those operations of a given operator that need to be broken into multiple parts to improve performance. The following operators are example candidate operators for which a staging point may be required. Inner join operator—an inner join operator can have multiple inputs, and perform a SQL join on multiple tables. Performance of a SQL join operation depends on the underlying database query processing. It is, therefore, desirable to split one large join into multiple ones with smaller join cardinalities. In such a case, staging points are required at intermediate join stages. The type of data station can be a global temporary table for optimal performance. Key lookup operator—a key lookup operator is implemented using a SQL inner join operation and, therefore, key lookup operators can be processed similar to inner join operators.

Two "incompatible" operators are linked together. One operator can be incompatible with another operator when the runtime implementation code for each of the operators is different. For example, if a JDBC extract operator is implemented as a java program, it is viewed as not compatible with a join operator that is implemented using SQL. In such ease, a data station operator is placed between the two operators so the data can be passed from one type to the other.

Example Staging Types of a Data Staging Operator

In one implementation, when a code generation system chunks a data flow into several small pieces, staging tables and staging files are created and maintained to hold intermediate row sets during an ETL process—e.g., data between extract and transform, between transform and load, or a chunking point inside a data flow. In one implementation, staging tables are database relational tables, and depending on how staging tables are used, a given stage table can be either a permanent table on ETL transform database, or a temporary table created in the data transformation session. In one implementation, staging files are flat files that hold intermediate transformed data in the text format. Staging tables and staging files can be created on a transform engine. A user can also input other specifications of a staging object, such as (table) spaces, indexes used for staging tables, location for staging files.

Staging Tables

In one implementation, staging tables are used to hold intermediate row sets during an ETL process. A code generation system can maintain a staging table, including DDL (Database Definition Language) associated table spaces and indexes. The "lifetime" of a staging table (e.g., the duration of a stage table and when should the staging table be deleted) can be externally specified by a user or internally determined by a code generation system depending on the usage of the staging object. For example, if a staging table is generated internally by a code generation system, and is used only for a specific dataflow stream, the staging table can be created at the beginning of the data flow execution as a database temporary table, which temporary table will be deleted when the session ends. If however, an internal staging table is used to chunk a data flow into multiple parallel execution pieces, the staging object can be defined as database permanent table to hold intermediate row sets until the end of an ETL application execution.

Staging Files

In one implementation, staging files are flat, text files. A flat file is a text-based ASCII file that is commonly used as a bridge between non-relational data sets and relational database tables. Staging flat files can be generated by a database export utility (such as DB2 SQL export) to export data from relational DB tables, or can be generated using a custom operator interface provided by a code generation system. Flat files can be loaded into target tables through a database load utility such as DB2 load.

JDBC Result Sets

JDBC result sets are the exchange point between two or more operators. The results of a previous (upstream) operator are represented as JDBC result sets and consumed by following (downstream) operators. JDBC result sets are memory objects and, in one implementation, the handles/names of the memory objects are determined by the code generation system.

Automatically Placed Data Station Operators

For internally generated staging points (e.g., those staging points not explicitly defined by a user), a code generation system can analyze the internal presentation of a data flow (e.g., through a QGM), identify staging points and insert data station operators that chunk the data flow into multiple smaller pieces (or sub-flows). Between these sub-flows, staging tables can be used to temporarily store intermediate transformed result sets. For example, when a chunking point is identified, a QGM can include staging tables/files (e.g., represented as table/file boxes) that link to other QGM nodes. QGM In one implementation, the name of each staging table within a QGM is unique. In one implementation, DDL statements for all staging tables generated within a data flow will be returned.

Figure 7:
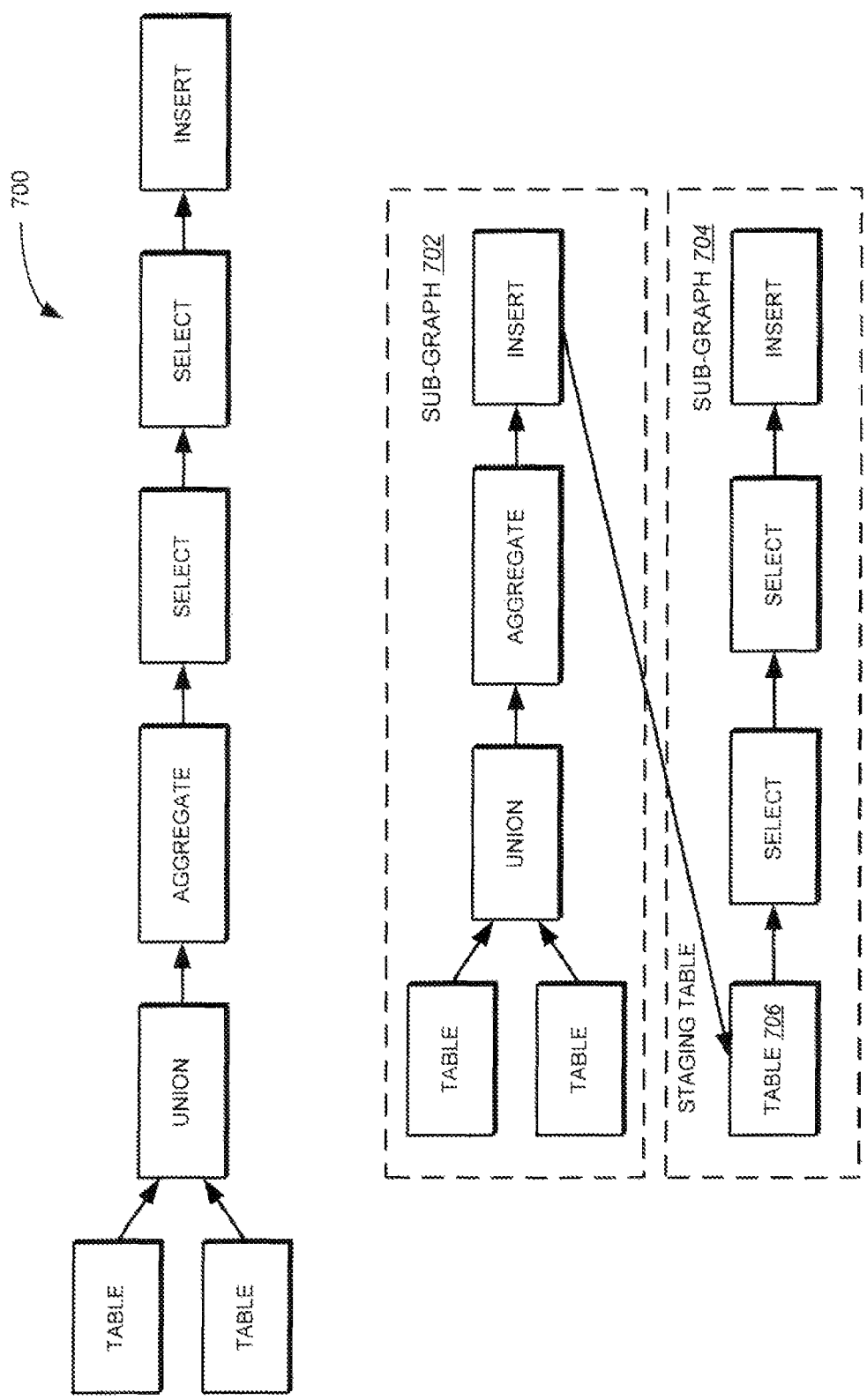
FIG. 7 illustrates an example query graph model (QGM) graph chunked into several corresponding sub-graphs in accordance with one implementation of the invention.

In one implementation, a code generation system (e.g., code generation system 210 of FIG. 2) chunks a QGM graph into several smaller graphs according to a chunking level (passed as an input parameter). In one implementation, a chunking level indicates the maximum number of nested queries and, accordingly, the number of QGM query boxes (e.g., select aggregate, union/except/intersect) traversed can be counted. For example, FIG. 7 illustrates a QGM graph 700 chunked into two smaller sub-graphs 702, 704, in which the chunking level is 3. When a chunking point is identified, a table box (e.g., table 706) can be added to represent the staging table, which staging table is also the top box of a chunked QGM sub-graph (e.g., sub-graph 704). The same staging box (staging table) is referred to as the starting point of a new sub-graph. The sequence of each chunked sub-graph is also tracked.

One or more of method steps described above can be performed by one or more programmable processors executing a computer program to perform functions by operating on input data and generating output. Generally, the invention can take the form of an entirely hardware embodiment, an entirely software embodiment or an embodiment containing both hardware and software elements. In one implementation, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Figure 8:
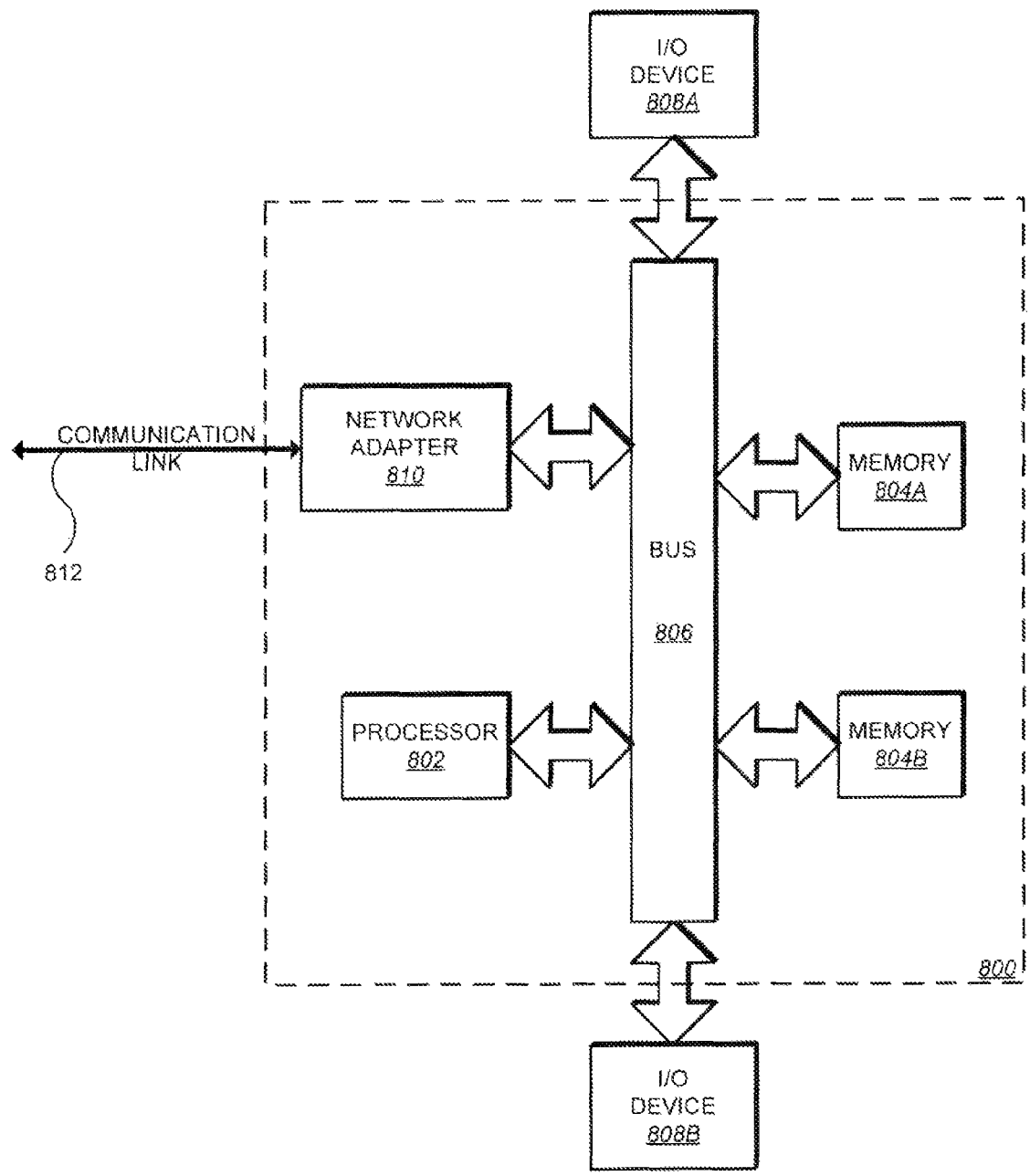
FIG. 8 is a block diagram of a data processing system suitable for storing and/or executing program code in accordance with one implementation of the invention.

FIG. 8 illustrates a data processing system 800 suitable for storing and/or executing program code. Data processing system 800 includes a processor 802 coupled to memory elements 804A-B through a system bus 806. In other implementations, data processing system 800 may include more than one processor and each processor may be coupled directly or indirectly to one or more memory elements through a system bus.

Memory elements 804A-B can include local memory employed during actual execution of the program code, bulk storage, and cache memories that provide temporary storage of at least some program code in order to reduce the number of times the code must be retrieved from bulk storage during execution. As shown, input/output or I/O devices 808A-B (including, but not limited to, keyboards, displays, pointing devices, etc.) are coupled to data processing system 800. I/O devices 808A-B may be coupled to data processing system 800 directly or indirectly through intervening I/O controllers (not shown).

In one implementation, a network adapter 810 is coupled to data processing system 800 to enable data processing system 800 to become coupled to other data processing systems or remote printers or storage devices through communication link 812. Communication link 812 can be a private or public network. Modems, cable modems, and Ethernet cards are just a few of the currently available types of network adapters.

Various implementations for modeling data exchange in a data flow associated with an extract, transform, and load (ETL) process have been described. Nevertheless, various modifications may be made to the implementations, and those variations would be within the scope of the present invention. For example, with respect to various implementations discussed above, different programming languages (e.g., C) can be used to stage intermediate processing data into a proprietary data format. Accordingly, many modifications may be made without departing from the scope of the following claims.

What is claimed is:

1. A computer-implemented method comprising:
receiving a data flow defining a sequence of operations for an associated extract, transform, and load (ETL) process;
converting the data flow into a logical operator graph (LOG), the logical operator graph being a representation of the data flow and including a plurality of operators corresponding to the sequence of operations defined by the data flow;
converting the logical operator graph into a query graph model (QGM) including inserting, based on pre-determined criteria, a data station operator between a first operator and a second operator of the plurality of operators associated with the logical operator graph, wherein the first operator is associated with a first type of runtime engine, wherein the second operator is associated with a second type of runtime engine distinct from the first type, the data station operator representing a staging point operable to exchange data from a format associated with the first type of runtime engine to a format associated with the second type of runtime engine; and generating an execution plan graph based on the query graph model, the execution plan graph including code to manage data staging between the first operator and the second operator.

2. The method of claim 1, wherein inserting the data station based on pre-determined criteria includes inserting the data station based on criteria associated with optimization, error recovery and restart, diagnostics and debugging, or cross-system data exchanges.

3. The method of claim 1, further comprising receiving user input overriding any automatic decisions to insert a data station based on the pre-determined criteria.

4. The method of claim 1, wherein inserting the data station based on pre-determined criteria includes inserting the data station responsive to user input explicitly specifying the data station between the first operator and the second operator.

5. The method of claim 1, wherein inserting the data station based on pre-determined criteria includes inserting a corresponding data station for each of the plurality of operators that requires chunking.

6. The method of claim 1, wherein a data exchange requirement is identified between the first operator and the second operator, wherein the code included in the execution plan graph is configured to exchange data from the format associated with the first type of runtime engine to the format associated with the second type of runtime engine, wherein the data station operator is inserted by a data processing application, and wherein the data processing application is configured to insert the data station operator upon each of:

(i) receiving user input explicitly specifying to insert the data station operator between the first operator and the second operator;

(ii) identifying that at least one of the first operator and the second operator requires chunking, wherein the identified operator is selected from a splitter operator, an inner join operator, a key lookup operator, an operator that supports discard of rows, and an operator that requires staging; and (iii) determining that the first operator is associated with the first type of runtime engine and that the second operator is associated with the second type of runtime engine distinct from the first type.

7. The method of claim 1, wherein inserting the data station based on pre-determined criteria includes inserting a data station between two linked operators of the plurality of operators that are incompatible.

8. The method of claim 7, wherein two linked operators of the plurality of operators are incompatible based on runtime implementation code for each of the two linked operators being different.

9. The method of claim 1, wherein the first type of runtime engine comprises a runtime engine operable to process Structured Query Language (SQL) based operators, and wherein the second type of runtime engine is a runtime engine operable to process non-SQL based operators.

10. The method of claim 1, wherein the first type of runtime engine comprises a relational database server, and wherein the second type of runtime engine comprises an ETL engine.

11. The method of claim 1, wherein the data station operator includes at least one of the following attributes: a data station type that specifies a format of data staged within the staging point, a pass through flag indicating if the data station operator can be ignored, a name indicating a staging table name or a staging file name, a data station lifetime specifying a time when the data station object is removable from the data flow, or a performance hint including pre-determined information to improve performance of execution of the data flow.

12. The method of claim 1, wherein the staging point stores at least one of a temporary database table, a permanent database table, a database view, a Java Database Connectivity (JDBC) result set, and a flat file.

13. A computer program product tangibly stored on a computer-readable storage medium, the computer program product comprising instructions for causing a programmable processor to:

receive a data flow defining a sequence of operations for an associated extract, transform, and load (ETL) process;

convert the data flow into a logical operator graph (LOG), the logical operator graph being a representation of the data flow and including a plurality of operators corresponding to the sequence of operations defined by the data flow;

convert the logical operator graph into a query graph model (QGM) including inserting, based on pre-determined criteria, a data station operator between a first operator and a second operator of the plurality of operators associated with the logical operator graph, wherein the first operator is associated with a first type of runtime engine, wherein the second operator is associated with a second type of runtime engine distinct from the first type, the data station operator representing a staging point operable to exchange data from a format associated with the first type of runtime engine to a format associated with the second type of runtime engine; and generate an execution plan graph based on the query graph model, the execution plan graph including code to manage data staging between the first operator and the second operator.

14. The computer program product of claim 13, wherein the instructions to insert the data station based on pre-determined criteria include instructions to insert the data station based on criteria associated with optimization, error recovery and restart, diagnostics and debugging, or cross-system data exchanges.

15. The computer program product of claim 13, wherein the instructions to insert the data station based on pre-determined criteria include instructions to insert the data station responsive to user input explicitly specifying the data station between the first operator and the second operator.

16. The computer program product of claim 13, wherein the instructions to insert the data station based on pre-determined criteria include instructions to insert a corresponding data station for each of the plurality of operators that requires chunking.

17. The computer program product of claim 13, wherein the first type of runtime engine comprises a runtime engine operable to process Structured Query Language (SQL) based operators, and wherein the second type of runtime engine is a runtime engine operable to process non-SQL based operators.

18. The computer program product of claim 13, wherein the first type of runtime engine comprises a relational database server, and wherein the second type of runtime engine comprises an ETL engine.

19. The computer program product of claim 13, wherein the data station operator includes at least one of the following attributes: a data station type that specifies a format of data staged within the staging point, a pass through flag indicating if the data station operator can be ignored, a name indicating a staging table name or a staging file name, a data station lifetime specifying a time when the data station object is removable from the data flow, or a performance hint including pre-determined information to improve performance of execution of the data flow.

20. The computer program product of claim 13, wherein the staging point stores at least one of a temporary database table, a permanent database table, a database view, a Java Database Connectivity (JDBC) result set, and a flat file.

* * * * *